United States Patent [19]

Smith et al.

[11] Patent Number: 5,687,878

[45] Date of Patent: Nov. 18, 1997

[54] FLEXIBLE TUBE WITH PUMP DISPENSER AND METHOD OF MAKING

[75] Inventors: Roger P. Smith, Exeter, N.H.; Kent A. Gearhart; Earnest E. Bliss, III, both of Perrysburg, Ohio

[73] Assignee: Owens-Brockway Plastic Products Inc., Toledo, Ohio

[21] Appl. No.: 493,837

[22] Filed: Jun. 22, 1995

Related U.S. Application Data

[63] Continuation-in-part of Ser. No. 228,048, Apr. 15, 1994, Pat. No. 5,632,951.

[51] Int. Cl.$^6$ ................................................. B65D 35/54
[52] U.S. Cl. .................................. 222/96; 222/321.9
[58] Field of Search ................................. 222/95, 96, 107, 222/212, 321.8, 321.9

[56] References Cited

U.S. PATENT DOCUMENTS

| | | | |
|---|---|---|---|
| 1,547,759 | 7/1925 | Journeay. | |
| 2,491,406 | 12/1949 | Zeeb | 285/120 |
| 3,191,814 | 6/1965 | Corsette et al. | 222/384 |
| 3,263,871 | 8/1966 | Thompson | 222/384 X |
| 3,288,334 | 11/1966 | Corsette | 222/107 |
| 3,358,062 | 12/1967 | Lemelson | 264/96 |
| 3,420,413 | 1/1969 | Corsette | 222/107 |
| 3,596,808 | 8/1971 | Corsette | 222/385 |
| 3,923,250 | 12/1975 | Boris | 222/385 X |
| 3,934,763 | 1/1976 | Steiman | 222/321 |
| 3,940,029 | 2/1976 | Horvath | 222/340 |
| 3,955,720 | 5/1976 | Malone | 222/396 |
| 3,991,914 | 11/1976 | Kotuby et al. | 222/321.9 |
| 4,154,374 | 5/1979 | Kirk, Jr. | 222/321 |
| 4,174,052 | 11/1979 | Capra et al. | 222/207 |
| 4,193,551 | 3/1980 | Saito et al. | 239/333 |
| 4,216,883 | 8/1980 | Tasaki et al. | 222/321 |
| 4,344,744 | 8/1982 | Schuster et al. | 417/550 |
| 4,345,691 | 8/1982 | Burke | 215/216 |
| 4,434,916 | 3/1984 | Ruscitti et al. | 222/321 |
| 4,479,589 | 10/1984 | Ford | 222/153 |
| 4,510,115 | 4/1985 | Gokcen et al. | 264/515 |
| 4,591,076 | 5/1986 | Iizuka | 222/321 |
| 4,685,594 | 8/1987 | Czech | 222/182 |
| 4,692,103 | 9/1987 | Anderson | 417/547 |
| 4,747,517 | 5/1988 | Hart | 222/137 |
| 4,790,117 | 12/1988 | Hansen | 53/410 |
| 4,854,484 | 8/1989 | Gentile et al. | 222/256 |
| 4,856,677 | 8/1989 | Brunet et al. | 222/96 X |
| 4,941,599 | 7/1990 | Reinertz et al. | 222/401 |
| 5,004,123 | 4/1991 | Stoody | 222/94 |
| 5,011,046 | 4/1991 | Graf et al. | 222/321 |
| 5,064,102 | 11/1991 | Montaner | 222/147 |
| 5,083,683 | 1/1992 | Knickerbocker | 222/382 |
| 5,102,018 | 4/1992 | Desazars de Montgailhard | 222/321 |
| 5,163,588 | 11/1992 | Cater | 222/321 |
| 5,183,185 | 2/1993 | Hutcheson et al. | 222/209 |
| 5,183,188 | 2/1993 | Rebeyrolle et al. | 222/383 |
| 5,292,033 | 3/1994 | Gueret | 222/95 |
| 5,332,126 | 7/1994 | Battegazzore | 222/107 |
| 5,388,727 | 2/1995 | Jouillat | 222/96 X |

FOREIGN PATENT DOCUMENTS

1112531  5/1968  United Kingdom ................ 222/321.9

*Primary Examiner*—Joseph Kaufman

[57] ABSTRACT

A flexible tube and pump dispenser for lotions and the like including a flexible plastic tube having a first end and a second end. The tube includes an integral rigid finish at one end which has a radial flange and a radially inwardly extending wall. The flange has an opening therethrough. A pump dispenser having a plunger and an axial body extends through the opening in the sealing flange of the finish. The axial body of the pump dispenser has a flange engaging the flange of the finish. The flange on the body is held in position engaging the wall on the finish.

17 Claims, 11 Drawing Sheets

FIG.21 ll
FLEXIBLE TUBE WITH PUMP DISPENSER AND METHOD OF MAKING

This application is a continuation-in-part of U.S. application Ser. No. 08/228,048, filed Apr. 15, 1994 now U.S. Pat. No. 5,632,951.

This invention relates to the manufacture of flexible tubes utilized for containing and dispensing viscous products such as personal care products and including a pump dispenser.

BACKGROUND AND SUMMARY OF THE INVENTION

In United States patent application Ser. No. 08/228,048, filed Apr. 15, 1994 now U.S. Pat. No. 5,632,951, incorporated herein by reference, a method is disclosed of making a flexible plastic tube which comprises injection molding a finish having an opening, extruding a tube integrally with the finish by relative movement of the finish with respect to an extruder orifice while continuing continuously extruding the tube, closing a blow mold about the extruded tube, blowing the tube into an integral container body having a closed bottom, opening the mold to provide an integral flexible tube with a finish thereon. Thereafter the method consists of decorating the body with indicia, cutting the closed end of the tube leaving an open-ended tube at the end opposite the finish, and applying a closure to the finish. A closure is applied either before or after cutting the bottom from the container. Preferably, the closure is applied to the finish after decorating and before cutting the closed end. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene and low density polyethylene may be used.

Among the objectives of the present invention are to provide a flexible tube made in accordance with the aforementioned method which includes a pump dispenser; wherein the pump dispenser is assembled to the plastic tube after it has been formed; wherein when the tube is formed with a finish for receiving the pump dispenser; wherein one form this pump dispenser is assembled through the open end of the tube; wherein in another form the pump dispenser is assembled on the finish from above; wherein the pump actuator can be made with a different color from the tube.

In accordance with the invention, the flexible tube with an integral finish includes a transverse wall having an opening for receiving the body of a pump dispenser. In one form the pump dispenser is inserted in the tube through the open end of the tube before the tube is filled and a flange on the pump dispenser is attached to the underside of the transverse wall of the finish, preferably by welding as by ultrasonic welding or spin welding. In another form, a collar is provided which has an outer annular wall, an integral inner annular wall spaced from said outer wall and an integral radial wall extending inwardly from the inner wall. The outer wall of the collar and the finish are mounted on the finish. The pump dispenser extends through the opening in the finish and a flange on the pump body extends between the transverse wall of the collar and the transverse wall of the finish. A sealing member is preferably interposed between the flange on the pump dispenser and transverse wall of the finish.

DESCRIPTION OF THE PREFERRED EMBODIMENTS

Referring to FIGS. 1-8, which is a schematic view of the succession of steps A-F to produce a filled container, the first step A comprises making a hollow plastic container by a method and apparatus wherein the neck or finish of the container is first injection molded, then a tube is extruded integrally with the injection molded finish, molds are closed about the tube and the tube is blown to form a container. Such a method and apparatus is shown in U.S. Pat. Nos. 2,170,987 and 2,911,673, incorporated herein by reference, and embodied in what has become known as a BC-3 machine.

Figure 1:
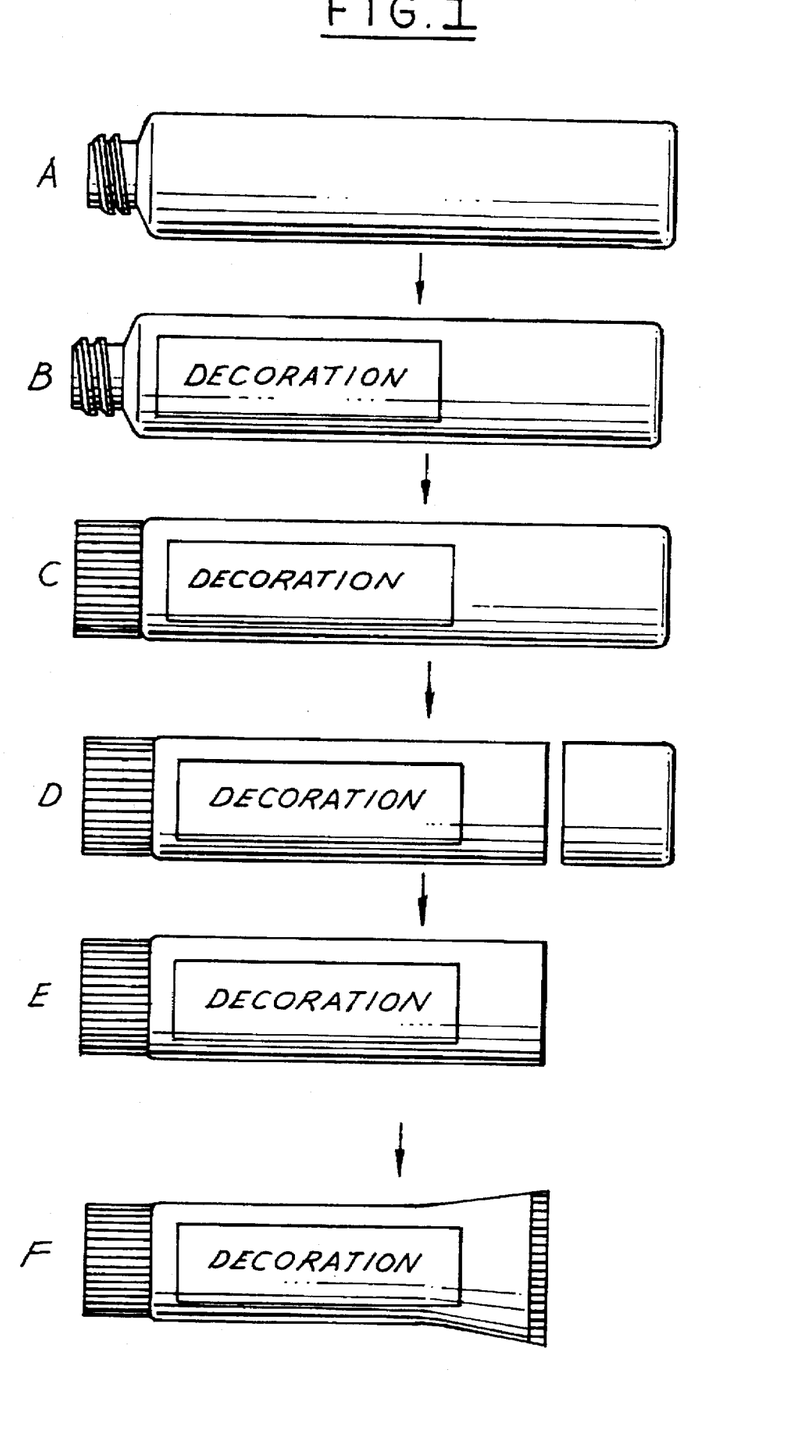
FIG. 1 is a diagram of the steps in making the flexible plastic tube embodying the invention.

As further shown in FIG. 1, the hollow blown container is then applied with indicia or decoration in one or more colors and designs through step B as may be desired. Step C of FIG. 1 shows applying a closure C to the container. The bottom of the container is then cut off as in step D leaving an open-ended tube as shown in step E. Step E shows the tube with the closure thereon as delivered to a customer. The purchaser of the open-ended tube fills the tube with viscous product through the open end and then seals the open end as at F.

A closure can be applied either before or after decorating, herein shown as applied after the first decorating step B. Preferably, the closure is applied after decorating.

Figure 2:
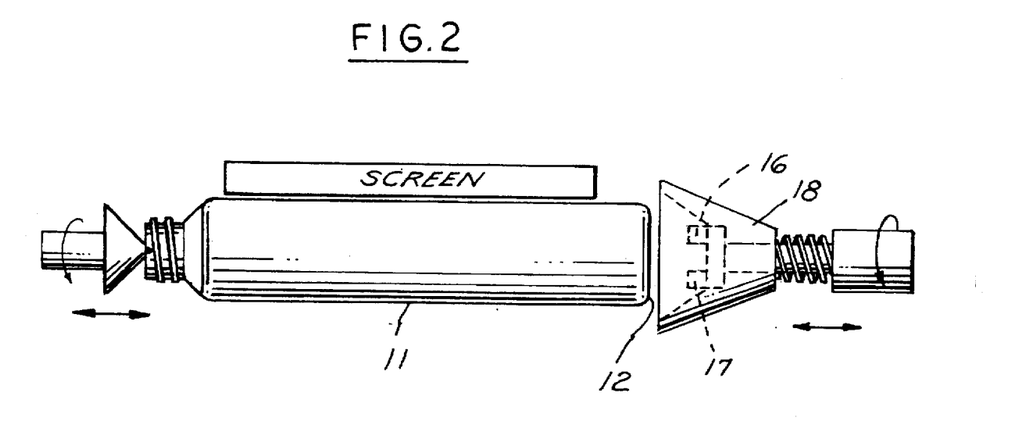
FIG. 2 is a diagram of an apparatus for silk screen decorating of the container.

In accordance with the invention, the decorating steps are performed by rotating the container with respect to silk screen printer stations, as shown for example in FIG. 2, by clamping the container and rotating the container relative to the station. Alternatively, decorating can be by in-mold labeling during blow molding of the tube or by heat bonding a label after the container is blown.

Referring to FIGS. 3–6, the container preferably comprises the injection mold finish 10, the extruded side wall or body 11 sufficiently thin thickness that it is flexible, and the integral bottom wall 12 which is thicker and relatively rigid to allow for driving the tube to rotate the tube in the capping and decorating operations. The wall 11 is preferably of substantially constant thickness, for example, ±0.006 in.

Figures 3, 4, 5, 6:
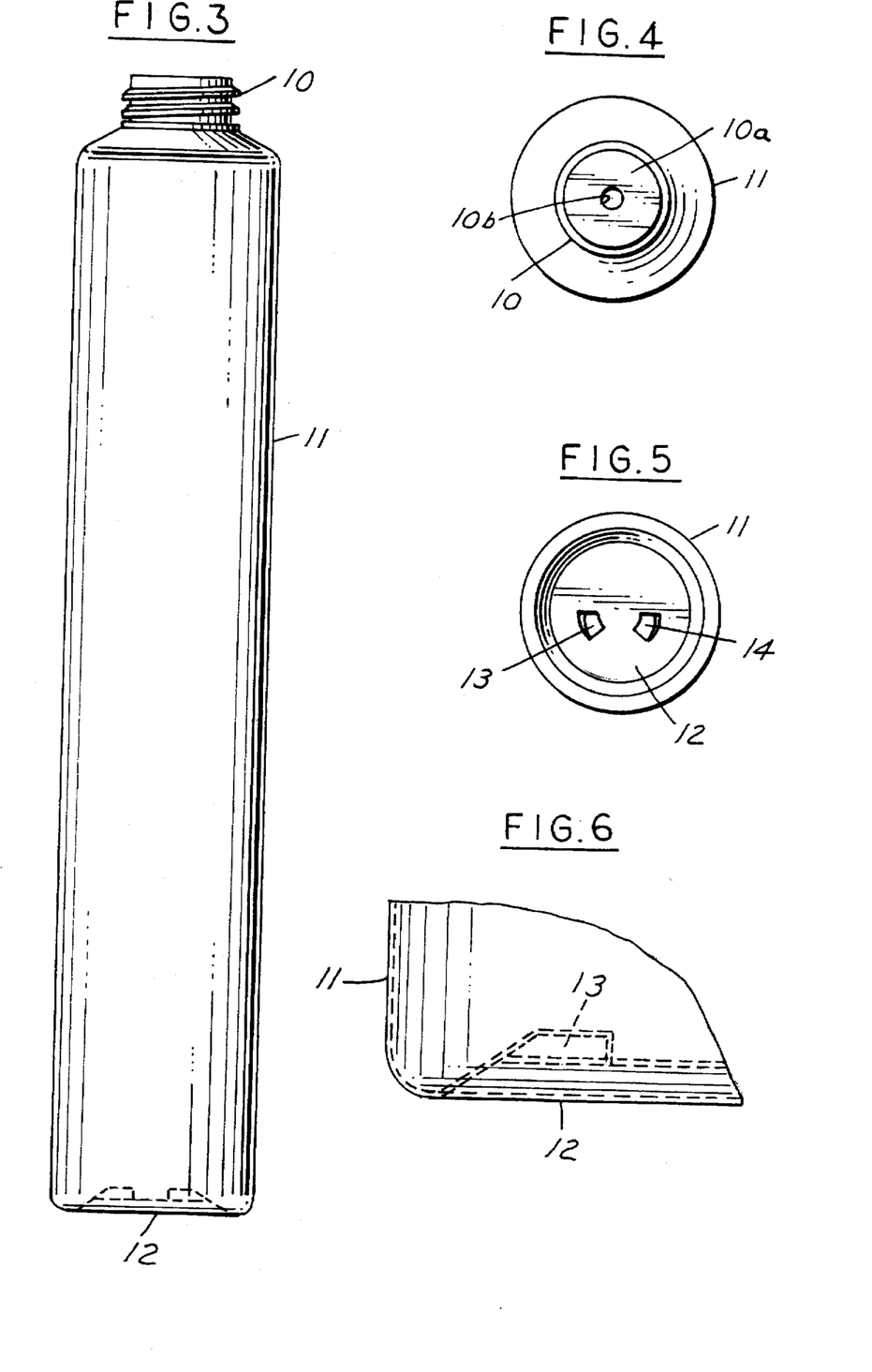
FIG. 3 is an elevational view of the container which is used to make the tube.
FIG. 4 is a top plan view.
FIG. 5 is a bottom plan view.
FIG. 6 is a fragmentary view of a portion of the lower end of the container.

As shown in FIGS. 5 and 6, the bottom wall 12 is formed with indentations or recesses 13, 14 which are utilized so that they can be engaged by lugs 16, 17 of a chuck 18 (FIG. 2) for the printing and application of the closure. As shown in FIG. 4, the finish 10 preferably includes a top or transverse wall 10a having a centrally located dispensing opening 10b.

The container is preferably made of linear low density polyethylene. A preferred composition is linear low density polyethylene having a dispersion index of 5. However, high density polyethylene and low density polyethylene may be used.

Figures 7, 8:
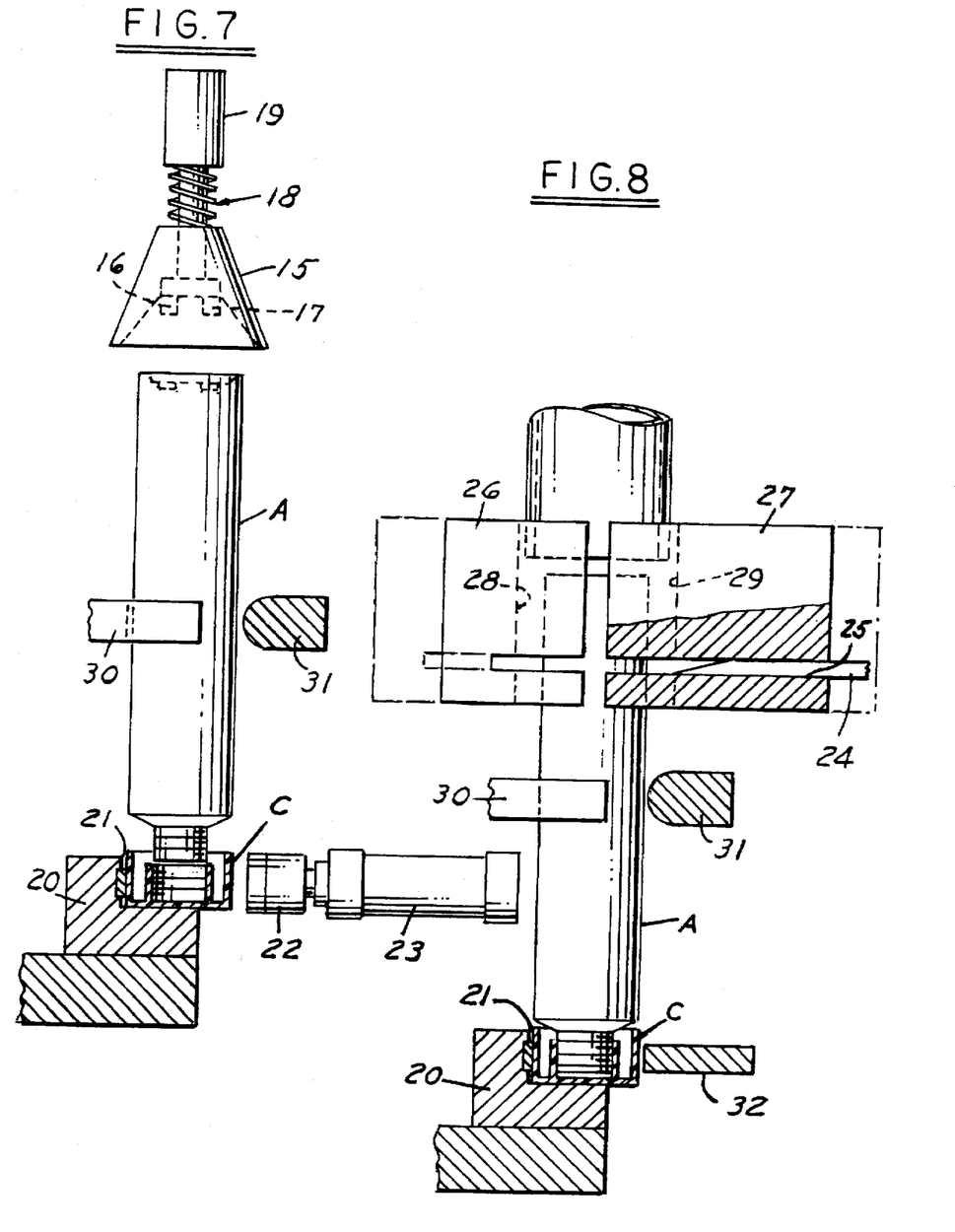
FIG. 7 is a fragmentary part sectional view of a preferred method and apparatus for applying the closure.
FIG. 8 is a fragmentary part sectional elevational view of an apparatus for severing the bottom from the container after it is decorated.

Referring to FIGS. 7 and 8, a preferred form of apparatus is shown in a copending application Ser. No. 08/356,936 filed Dec. 15, 1994, having a common assignee with the present application, incorporated herein by reference.

Referring to FIG. 8, the apparatus for severing the bottom of a container comprises a lower star wheel 20 having recesses 21 for receiving the closures C on the inverted container A and an associated guide rail 32. The apparatus also includes an upper star wheel 30 with recesses for the container body 34 and an associated guide rail 31. The upper end of the container is clamped by blocks 26, 27 having recesses 28, 29 which are movable relative to one another to hold the upper end of the container A. A guillotine blade 24 is movable across the bottom of the closure by a cylinder to sever the bottom of the container A along a plane that is at 90° to the vertical or longitudinal axis of the container A. The guillotine 24 is guided by guide surfaces 25 in the blocks 26, 27.

The apparatus of FIG. 7 is preferably positioned at a capping station adjacent a rotary turret 30 which is driven intermittently past the capping station to apply the container to the closure. The apparatus shown in FIG. 8 is located at a trimming station and the turret 30 moves the inverted containers past the trimming station to sever the bottom of the container. A guide rail 32 retains the lower end of the capped container in recesses the lower star wheel during severing of the bottom of the container.

Figures 9, 10:
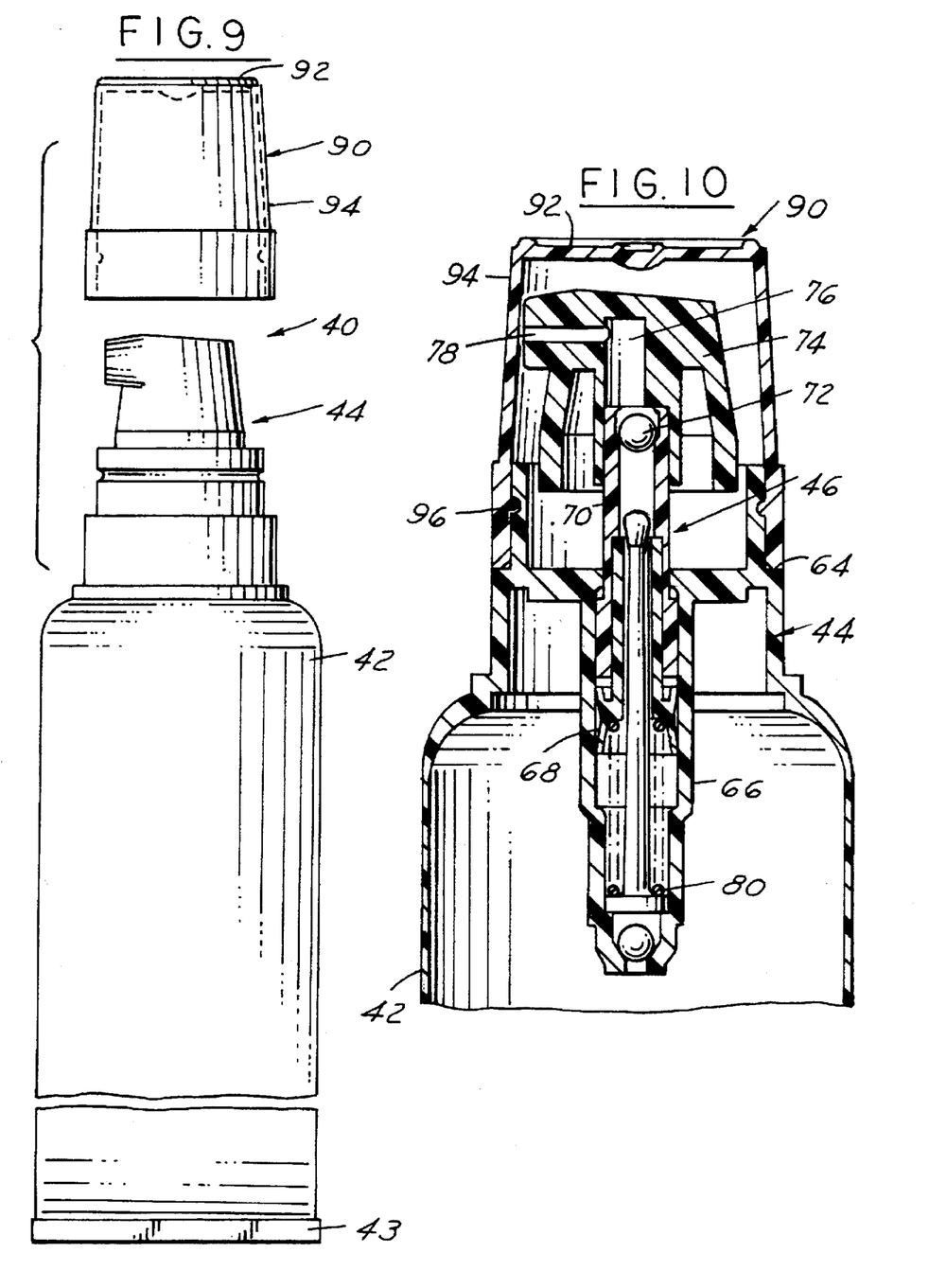
FIG. 9 is a fragmentary exploded view of a package comprising the invention.
FIG. 10 is a fragmentary vertical sectional view of the upper end of the package.
Figures 11, 12, 13, 14:
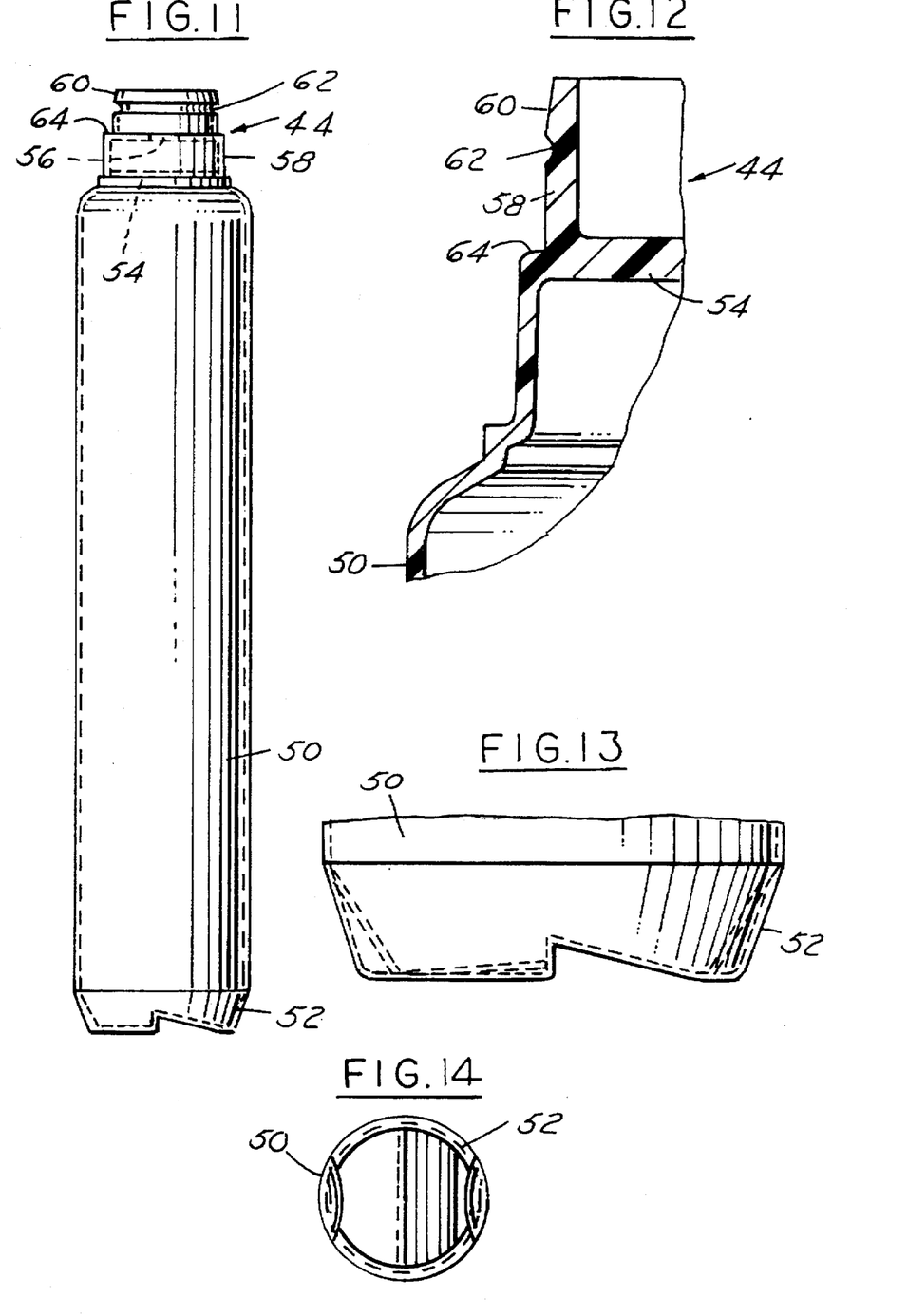
FIG. 11 is an elevational view of the flexible container from which the flexible tube used in the package shown in FIGS. 9 and 10 is made.
FIG. 12 is a fragmentary sectional view on an enlarged scale of the finish on the container shown in FIG. 11.
FIG. 13 is a fragmentary view on an enlarged view of the lower end of the container shown in FIG. 11.
FIG. 14 is a bottom plan view of the container shown in FIG. 11.
Figure 15:
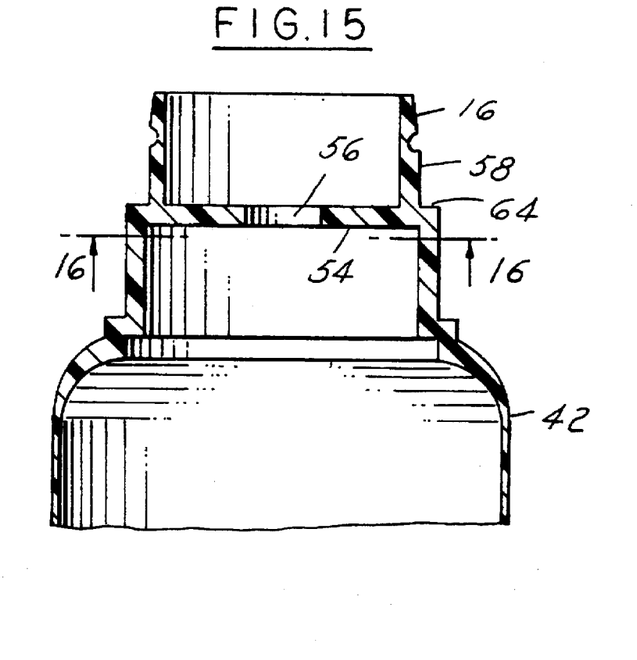
FIG. 15 is a fragmentary vertical sectional view of the upper end of the flexible tube.
Figure 16:
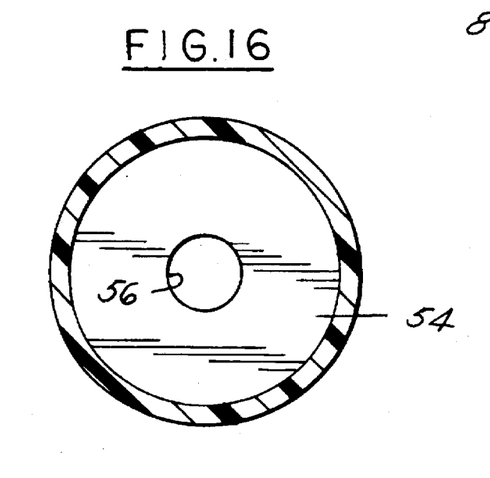
FIG. 16 is a sectional view taken along the line 16—16 in FIG. 15.

The above description is substantially like that in the aforementioned United States patent application Ser. No. 08/228,048, incorporated herein by reference. Referring to FIGS. 9 and 10, the flexible tube and pump dispenser package 40 embodying the invention comprises a flexible tube 42 having an integral finish 44 and a pump dispenser 46 attached to the finish 44 as presently described.

Referring to FIGS. 11–14, the flexible container 48 from which the flexible tube 42 is formed comprises a flexible cylindrical body 50, a base 52 which is subsequently cut off in the aforementioned manner and the integral finish 44, the finish 44 includes a transverse radial wall 54 having enlarged opening 56 for receiving a portion of the pump dispenser 46 as presently described. The finish 44 further includes an integral annular wall 58 that extends axially from the wall, for reasons presently described. The annular wall 58 includes an annular inwardly tapered outer surface 60 at its upper and an annular groove 62 intermediate its upper end and transverse wall 54 outwardly extending shoulder 64 is also provided on the finish.

Figure 17:
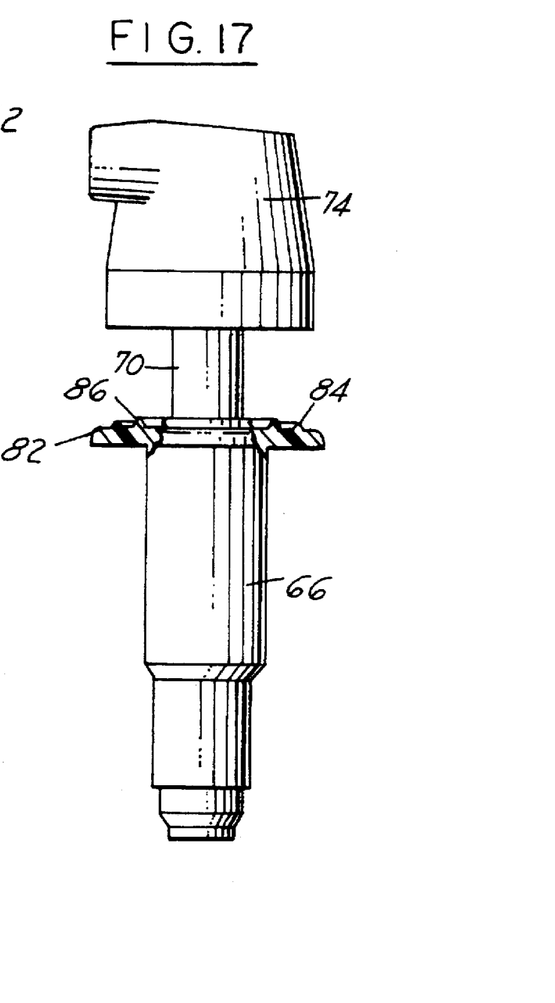
FIG. 17 is an elevational view of the pump dispenser before it is applied to the flexible tube.

Referring to FIGS. 10 and 17, the pump dispenser 46 consists of a pump body 66 a piston 68 and a stem 70 movable with the piston 68. A ball 72a is provided at the upper end stem 70 and has limited axial movement. Similarly a ball is provided at the lower end of stem 70 and has limited movement. The pump dispenser further includes an actuator 74 having passages 76, 78 through which the contents are dispensed when the actuator is moved downwardly against the action of the spring 80. Such a construction is old and well known.

In accordance with the invention, the body 66 of the pump dispenser 46 is provided with an integral flange 82 (FIG. 17) that is bonded to the underside of the transverse wall 10 by welding, as by ultrasonic welding. The upper surface of the flange 82 is provided with annular V-shaped ribs 84, 86 that are concentric with one another, rib 86 having a greater axial height than rib 84 such that when the sonic welding occurs the ribs will fuse to the underside of the transverse wall 54 of the tube thereby accommodating any variations in the under surface of the wall 54 (FIG. 10). Preferably, the rib 86 is spaced inwardly of the rib 84.

Figures 28, 29:
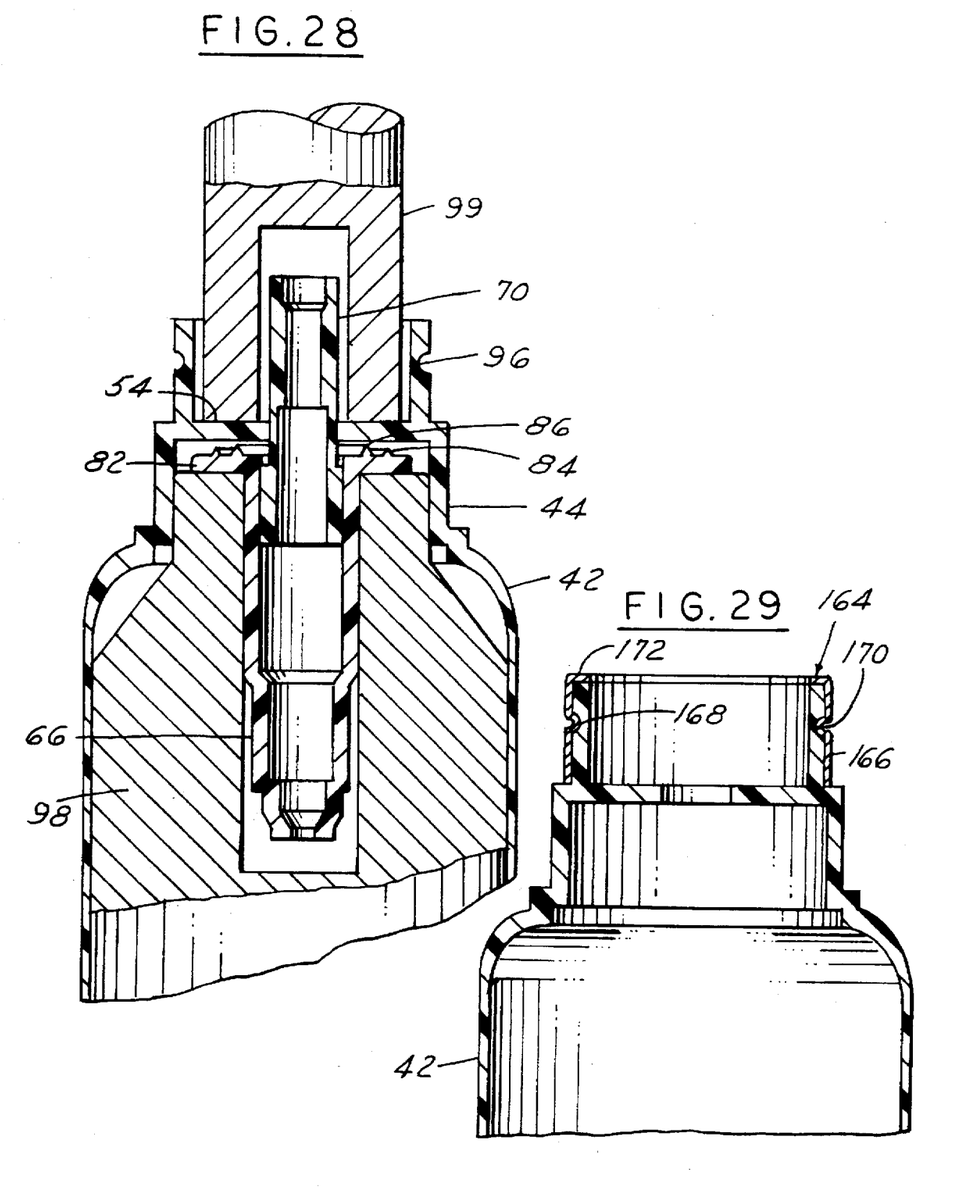
FIG. 28 is a fragmentary vertical sectional view of an apparatus for assembling the flexible tube and pump dispenser shown in FIGS. 9-15.
FIG. 29 is a fragmentary vertical sectional view showing a modified form.

In the making of the package, the pump dispenser 46 is inserted through the open end of the tube 42 prior to the closing and filling of the tube and the flange 82 is sonic welded to the wall 54 by engagement of a mandrel 98 with the flange 54 and a complementary mandrel 99 with the top surface of the wall 54 as shown schematically in FIG. 28. The tube 42 is then filled with product and sealed as at 43. The package further includes an overcap 90 that has a base wall 92 and a peripheral skirt 94 with an inner annular rib 96 engaging the annular groove 60. The lower edge of skirt 94 engages the shoulder 64.

Figures 18, 19:
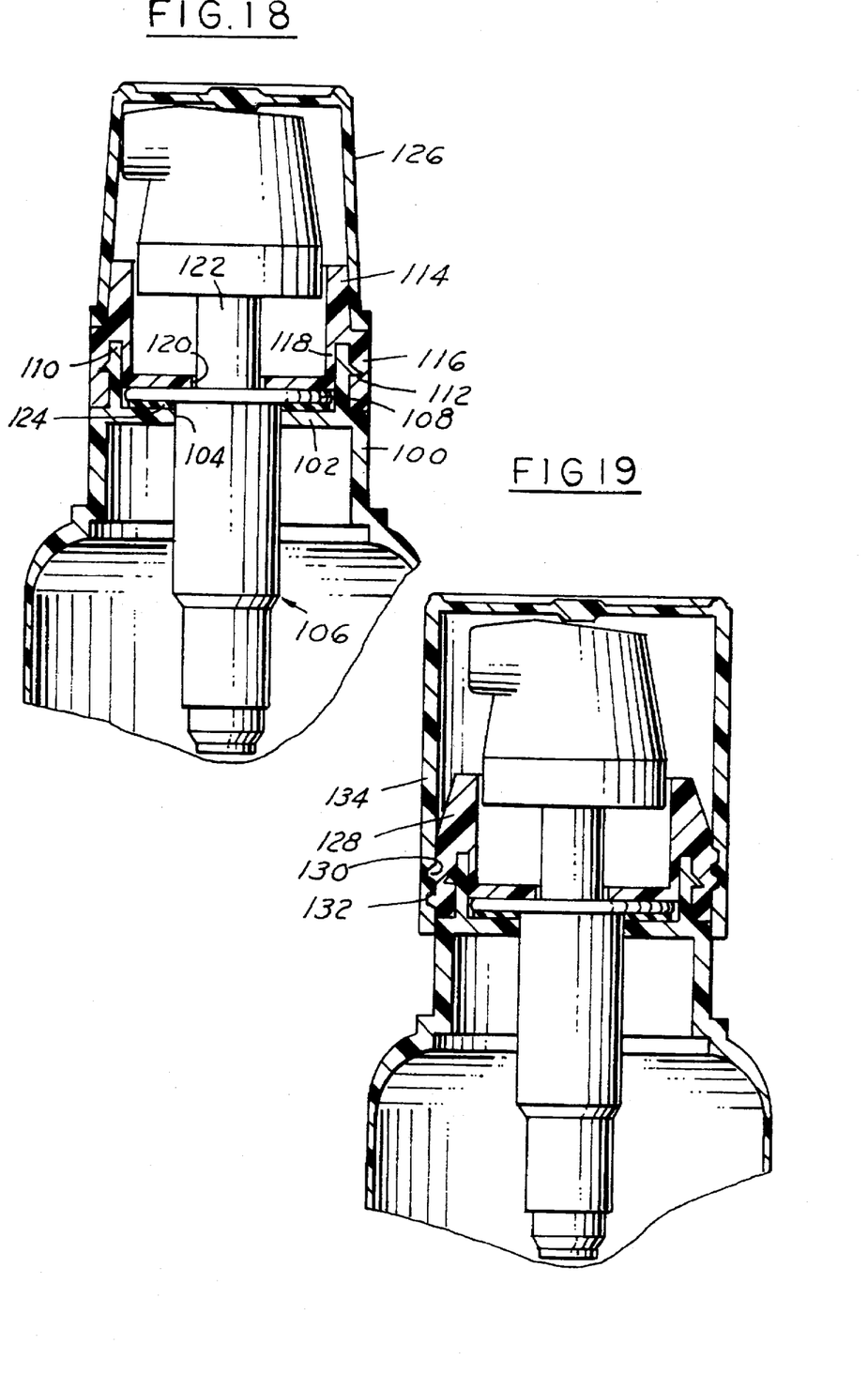
FIG. 18 is a fragmentary vertical sectional view of a modified form of flexible tube and pump dispenser.
FIG. 19 is a fragmentary vertical sectional view of a further modified form of flexible tube and pump dispenser.

In the form shown in FIG. 18, the finish 100 is formed with a transverse wall 102 having an opening 104 for receiving the body of the pump dispenser 106 which is identical in construction with that shown in FIGS. 11–17 except the flange 108 does not have the annular ribs 52, 54 for sonic welding. The annular wall 110 of the finish is formed with an assymetrical rib 112 over which a collar or fitment 114 is provided. The collar 114 includes an annular outer wall 116 and an annular inner wall 118 having an opening 120 through which the stem 122 of the pump dispenser 101 extends. The collar 114 functions to hold the flange 106 of the pump dispenser 106 in engagement with the transverse wall 102 preferably with a resilient seal 124. In this form, overcap 126 has a friction fit with the finish.

The form shown in FIG. 19 is substantially identical of that shown in FIG. 18 except that the collar 128 is formed with a thread 130 for engaging a complementary thread 132 on the overcap 134.

Figure 20:
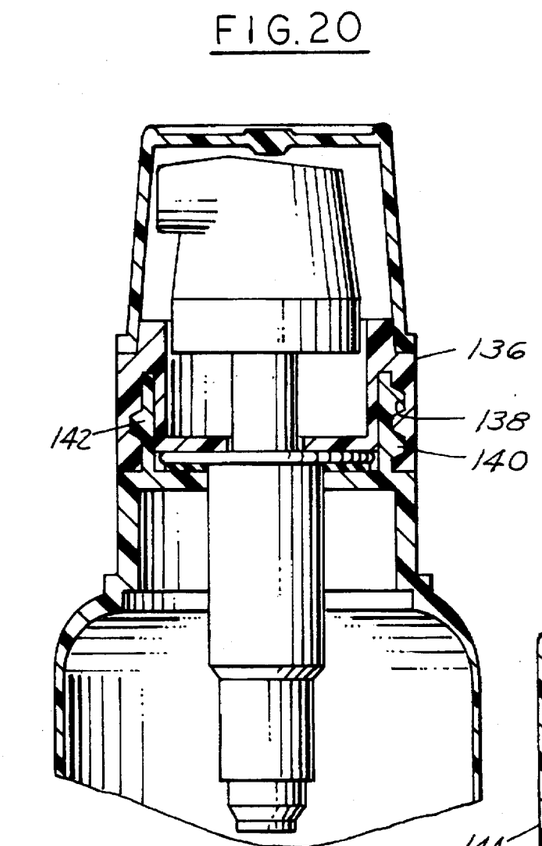
FIG. 20 is a fragmentary vertical sectional view of another form of flexible tube and pump dispenser.

In the form shown in FIG. 20, the collar 136 is provided with an internal thread 138 engaging an external thread 140 on the wall 142 of the finish. In this form the overcap is frictionally held as in the form shown in FIG. 18.

Figure 21:
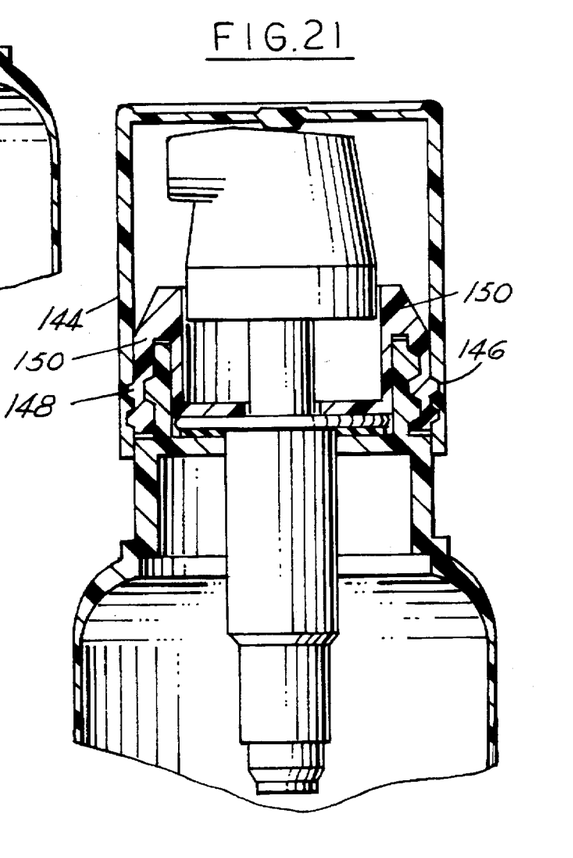
FIG. 21 is a fragmentary vertical sectional view of a further form of flexible tube and pump dispenser.

In the form shown in FIG. 21, the structure is substantial identical to that of FIG. 20 except that the overcap 144 is provided with an internal thread 146 engaging an external thread 148 on the collar 150.

Figure 22:
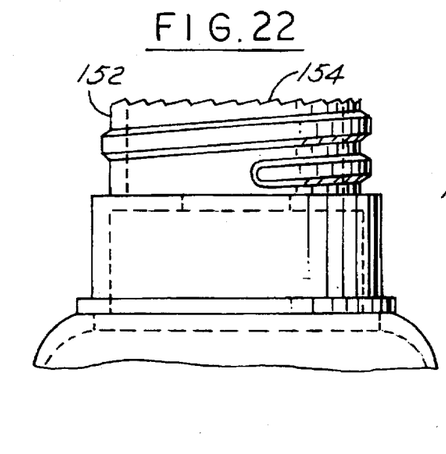
FIG. 22 is a fragmentary elevational view of a modified form of finish on the flexible tube.
Figure 23:
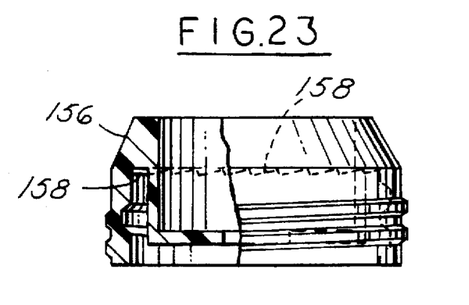
FIG. 23 is an elevational view of a fitment for use on the flexible tube shown in FIG. 22.
Figure 24:
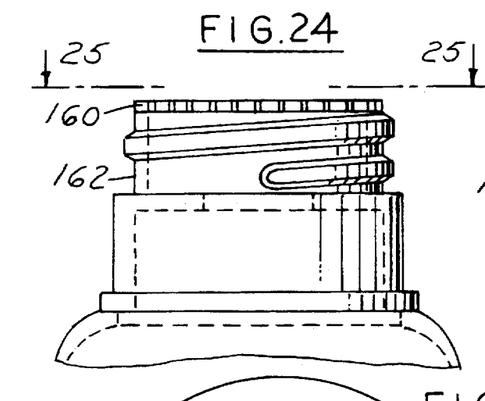
FIG. 24 is a fragmentary elevational view of another form of finish on the flexible tube.
Figures 25, 27:
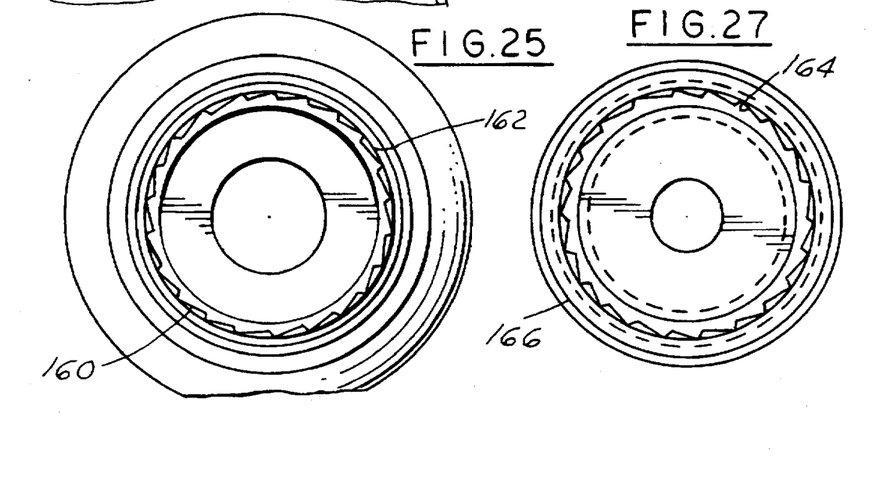
FIG. 25 is a view taken along line 25—25 in FIG. 24.
FIG. 27 is a view taken along the line 27—27 in FIG. 26.
Figure 26:
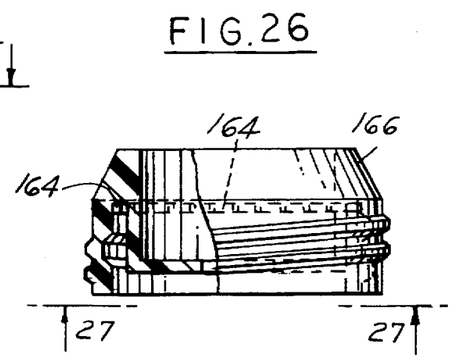
FIG. 26 is an elevational view of a fitment for use on the flexible tube shown in FIGS. 24 and 25.

Referring to FIGS. 22 and 23, there are shown a modified form of finish and collar which can be used where a collar is used. As shown in FIG. 23, the annular wall 152 on the finish of the flexible tube is threaded and is formed with an annular array of assymetrical ratcheting teeth 154 on the top surface. Collar 156 is formed with an annular array of complementary assymetrical teeth 158 that engage teeth 154 when the collar 156 is threaded on the finish such that the collar can be removed.

In the form shown in FIGS. 24–27, the assymetrical teeth 160 are provided on the outer surface of the annular wall 162. The assymetrical teeth 164 on collar 166 are provided on an inner surface.

Referring to FIG. 29, a decorative metal band 164 is applied to the finish of the tube 42 shown in FIGS. 9–15. Band 164 includes an axial cylindrical wall 166 which has a portion that is complementary to wall 58. The band 164 includes a bead 168 that extends inwardly into groove 62 and an external groove 170. The band 164 includes an integral radial flange 172 which engages the top surface of the finish.

What is claimed is:

1. A flexible tube and pump dispenser for lotions and the like comprising a flexible plastic tube having a first end and a second end, said tube including an integral rigid finish at one end, said integral finish having a radial flange and a radially inwardly extending wall, said flange having an opening therethrough, a pump dispenser having a plunger and an axial body extending through said opening in said sealing flange of said finish, said axial body of said pump dispenser having a flange engaging said flange of said finish, said flange of said pump mechanism being provided with an integral projection on said flange of the pump mechanism that is fused during the fusion welding to the surface of said radially inwardly extending wall on said finish, means for holding said flange on said body in position engaging said wall on said finish by fusion welding said flange on said body of the pump dispenser to said radially extending wall.

2. The flexible tube and pump dispenser set forth in claim 1 wherein said welding is by sonic welding.

3. The flexible tube and pump dispenser set forth in claim 1 wherein said projections comprises at least one annular rib on the upper side of said flange of said pump mechanism.

4. The flexible tube and pump dispenser set forth in claim 3 including a second concentric annular rib on said flange of said body wherein one of said annular ribs has a greater axial height than the other before welding, said second annular rib being radially inwardly of said first concentric annular rib.

5. The flexible tube and pump dispenser set forth claim 1 wherein said finish includes an integral annular wall extending upwardly from said radially extending wall.

6. The flexible tube and pump dispenser set forth in claim 5 wherein said integral annular wall includes an annular groove for receiving an annular rib of an overcap.

7. The flexible tube and pump dispenser set forth in claim 6 wherein said annular wall has a free end including an annular external surface tapering upwardly and inwardly.

8. A flexible tube and pump dispenser for lotions and the like comprising a flexible plastic tube having a first end and a second end, said tube including an integral rigid finish at one end, said integral finish having a radial flange and a radially inwardly extending wall, said flange having an opening therethrough, a pump dispenser having a plunger and an axial body extending through said opening in said sealing flange of said finish, said axial body of said pump dispenser having a flange engaging said flange of said finish, means for holding said flange on said body in position engaging said wall on said finish, said means for holding said flange on said body in position engaging said wall of said finish comprising a collar comprising an outer annular wall, an integral inner annular wall spaced from said outer wall and an integral radial wall extending inwardly from said inner wall, interengaging means between said outer wall of said collar and said finish for mounting said collar on said finish, said collar having an inwardly radial flange engaging the upper surface of the flange on said pump dispenser.

9. The flexible tube and pump dispenser set forth in claim 8 wherein said collar is made of plastic.

10. The flexible tube and pump dispenser set forth in claim 9 wherein said interengaging means comprises thread means.

11. The flexible pump and pump dispenser set forth in claim 8 including interengaging means between said collar and said finish restraining said collar from being removed by relative rotation.

12. The flexible tube and pump dispenser set forth in claim 8 including a resilient seal between said radial wall of said collar and said flange on said pump mechanism.

13. A flexible tube and pump dispenser set forth in any one of claims 3–7 and 9–12 wherein said tube is made by injection of the finish and extusion of the tube.

14. A flexible tube and pump dispenser for lotions and the like comprising a flexible plastic tube having a first end and a second end, said tube including an integral rigid finish at one end, said integral finish having a radial flange and a radially inwardly extending wall, said flange having an opening therethrough, said flange having an underside, a pump dispenser having a plunger and an axial body extending through said opening in said sealing flange of said finish, said axial body of said pump dispenser having a flange engaging the underside of said flange of said finish, means for holding said flange on said body in position engaging the underside of said radially extending wall on said finish by fusion welding said flange on said body of the pump dispenser to said radially extending wall;

wherein said flange of said pump mechanism is provided with integral projections on the upper surface of said flange of the pump mechanism that are fused during the fusion welding to the undersurface of said radially inwardly extending wall on said finish.

15. The flexible tube and pump dispenser set forth in claim 14 wherein said projections comprise at least one annular rib on the upper side of said flange of said pump mechanism.

16. The flexible tube and pump dispenser set forth in claim 15 including a second concentric annular rib on the upper side of said flange of said body wherein one of said annular ribs has a greater axial height than the other before welding.

17. The flexible tube and pump dispenser set forth in claim 16 wherein said welding is by sonic welding.

* * * * *